United States Patent
Sogabe

(10) Patent No.: US 8,478,918 B2
(45) Date of Patent: Jul. 2, 2013

(54) COMMUNICATION INTERFACE CIRCUIT, ELECTRONIC DEVICE, AND COMMUNICATION METHOD

(75) Inventor: Keigo Sogabe, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 705 days.

(21) Appl. No.: 12/700,258

(22) Filed: Feb. 4, 2010

(65) Prior Publication Data

US 2010/0199005 A1 Aug. 5, 2010

(30) Foreign Application Priority Data

Feb. 4, 2009 (JP) .................................. 2009-023366

(51) Int. Cl.
*G06F 13/42* (2006.01)

(52) U.S. Cl.
USPC .......................................... 710/106; 710/305

(58) Field of Classification Search
USPC ................... 710/105, 106, 305, 313; 713/320, 713/323, 324
See application file for complete search history.

(56) References Cited

U.S. PATENT DOCUMENTS

| | | | | |
|---|---|---|---|---|
| 6,429,704 B1 * | 8/2002 | Kanai et al. | ..................... | 327/113 |
| 7,010,711 B2 * | 3/2006 | Bashford et al. | ............... | 713/323 |
| 7,028,199 B2 * | 4/2006 | Ayyavu et al. | ................. | 713/323 |
| 7,133,956 B2 * | 11/2006 | Handa et al. | ................... | 710/305 |
| 7,313,712 B2 * | 12/2007 | Cherukuri et al. | ............ | 713/324 |
| 7,328,356 B2 * | 2/2008 | Igari | .............................. | 713/320 |
| 7,856,567 B2 * | 12/2010 | Igari | .............................. | 713/320 |
| 7,885,282 B2 * | 2/2011 | Priborsky | ...................... | 370/419 |
| 2004/0212910 A1 * | 10/2004 | Suzuki et al. | .................... | 360/68 |
| 2005/0024083 A1 * | 2/2005 | Kitamura et al. | ............... | 326/21 |
| 2005/0079819 A1 | 4/2005 | Tsutsui | | |
| 2009/0187779 A1 * | 7/2009 | Liu et al. | ....................... | 713/323 |
| 2010/0250791 A1 * | 9/2010 | Johnson et al. | ................. | 710/18 |

FOREIGN PATENT DOCUMENTS

| | | |
|---|---|---|
| JP | 01-155760 A | 6/1989 |
| JP | 11-298536 A | 10/1999 |
| JP | 2005-72864 A | 3/2005 |
| JP | 2006-018388 | 1/2006 |
| JP | 2008-041050 | 2/2008 |

OTHER PUBLICATIONS

Notice of Reasons for Rejection mailed by Japan Patent Office on Dec. 7, 2010 in the corresponding Japanese patent application No. 2009-023366.

* cited by examiner

*Primary Examiner* — Khanh Dang
(74) *Attorney, Agent, or Firm* — Knobbe, Martens, Olson & Bear, LLP

(57) ABSTRACT

According to one embodiment, an interface comprises establishing a connection to a communicatee device, transmitting a connection maintenance signal to the communicatee device, and decreasing a maximum amplitude of the connection maintenance signal from a first amplitude, establishing a connection to the communicatee device again when communication is disabled, and transmitting the connection maintenance signal to the communicatee device, and setting the maximum amplitude of the connection maintenance signal to a second amplitude which is larger than the maximum value of the connection maintenance signal obtained when the communication is disabled by a predetermined value.

9 Claims, 10 Drawing Sheets

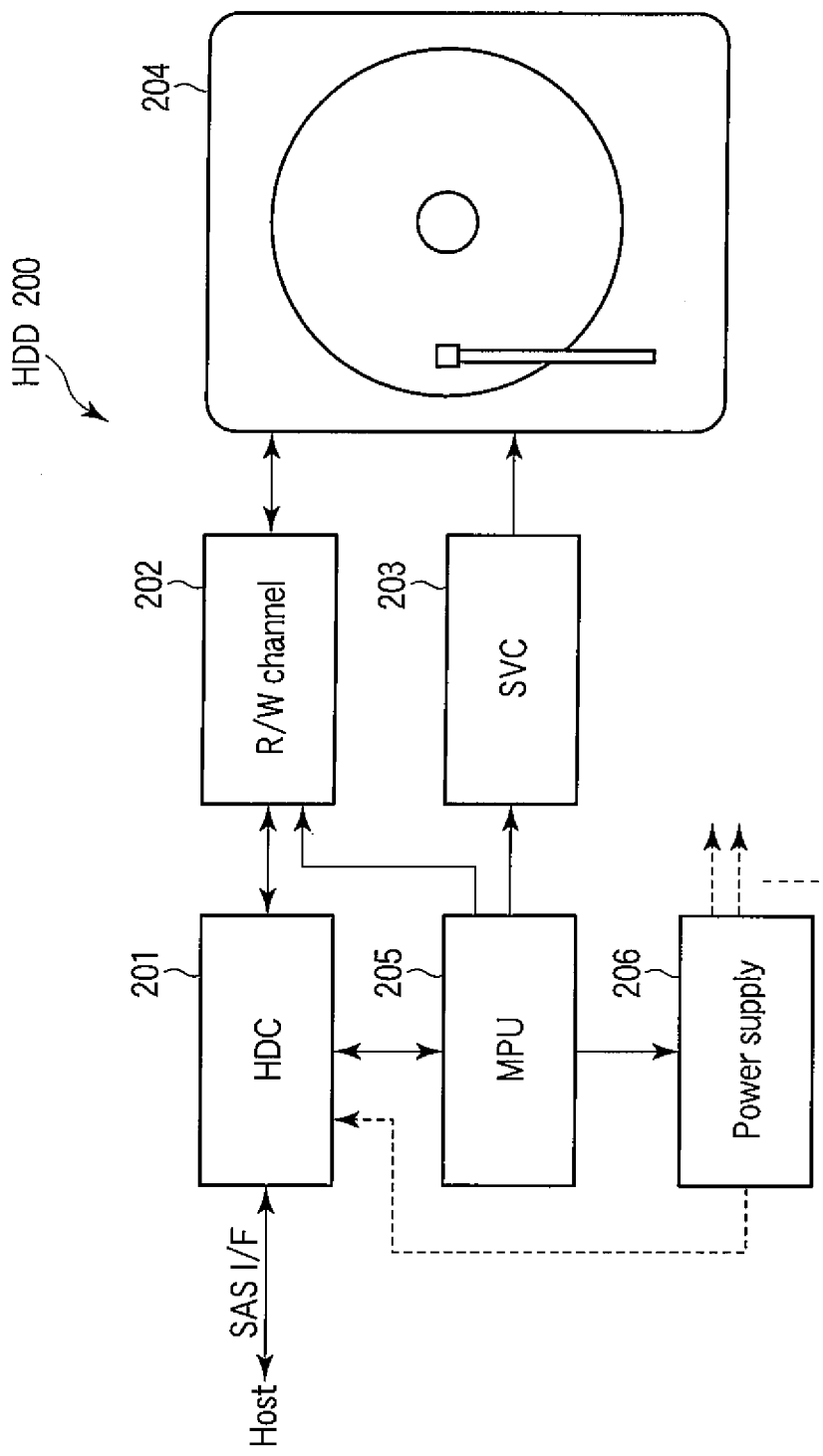
F I G. 3

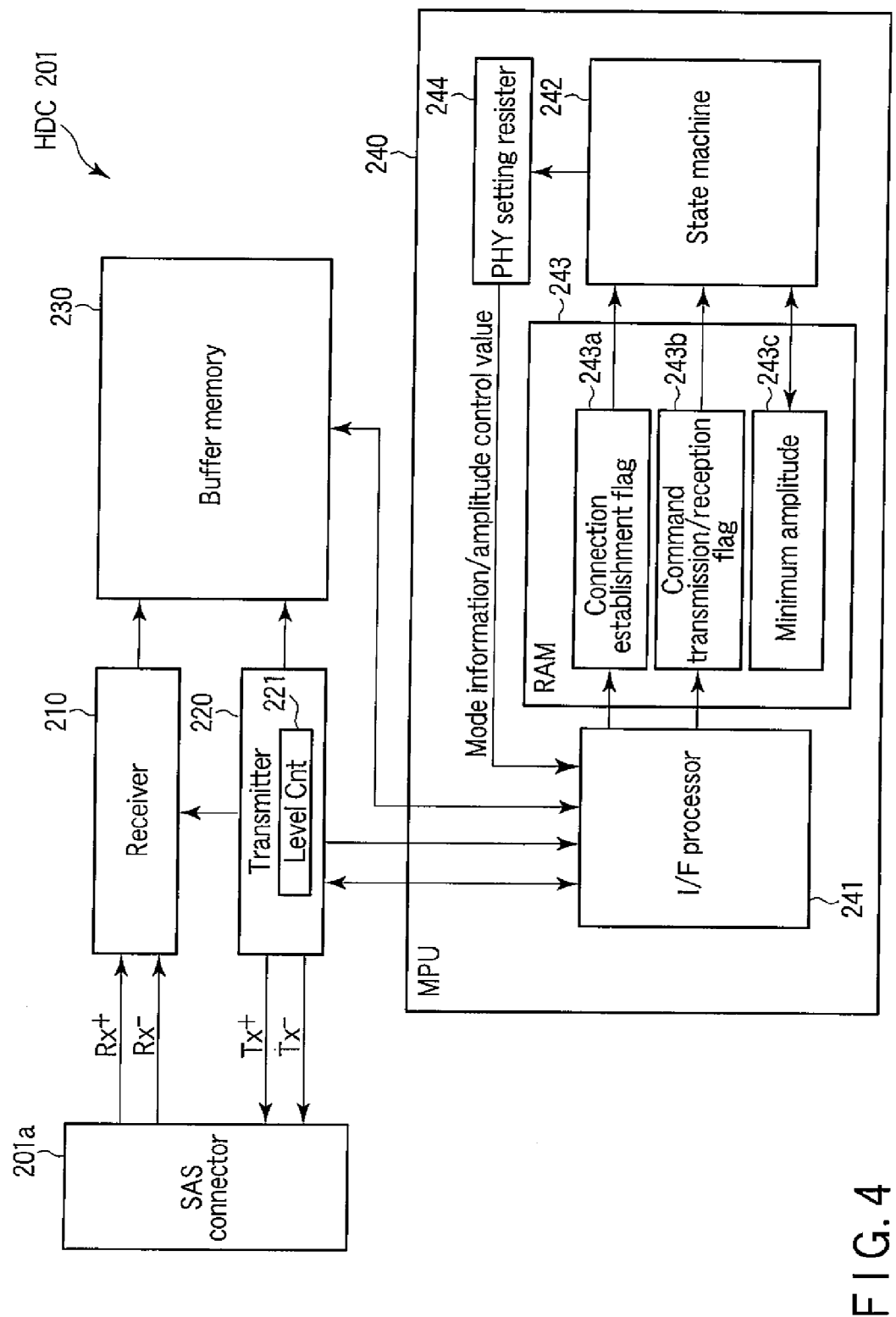
F I G. 4

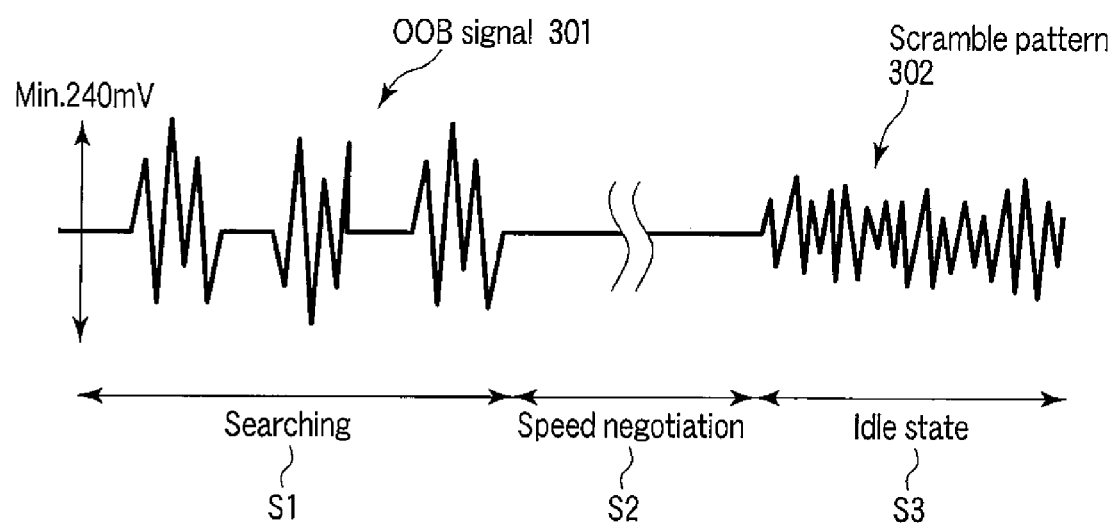
F I G. 5

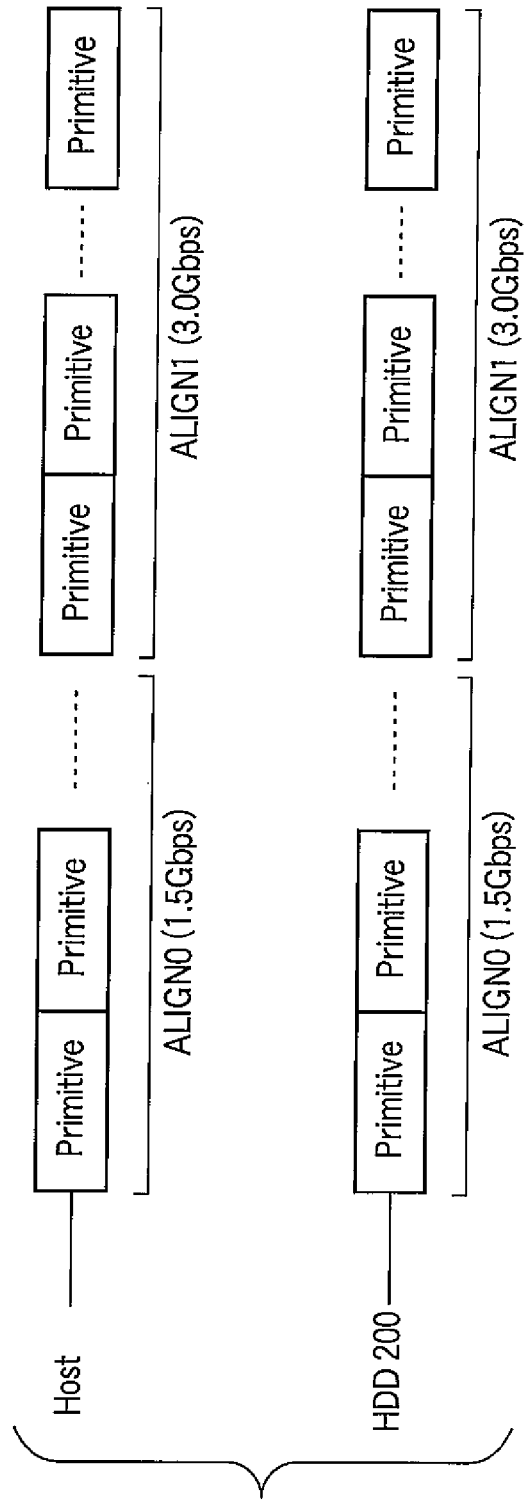
F I G. 7

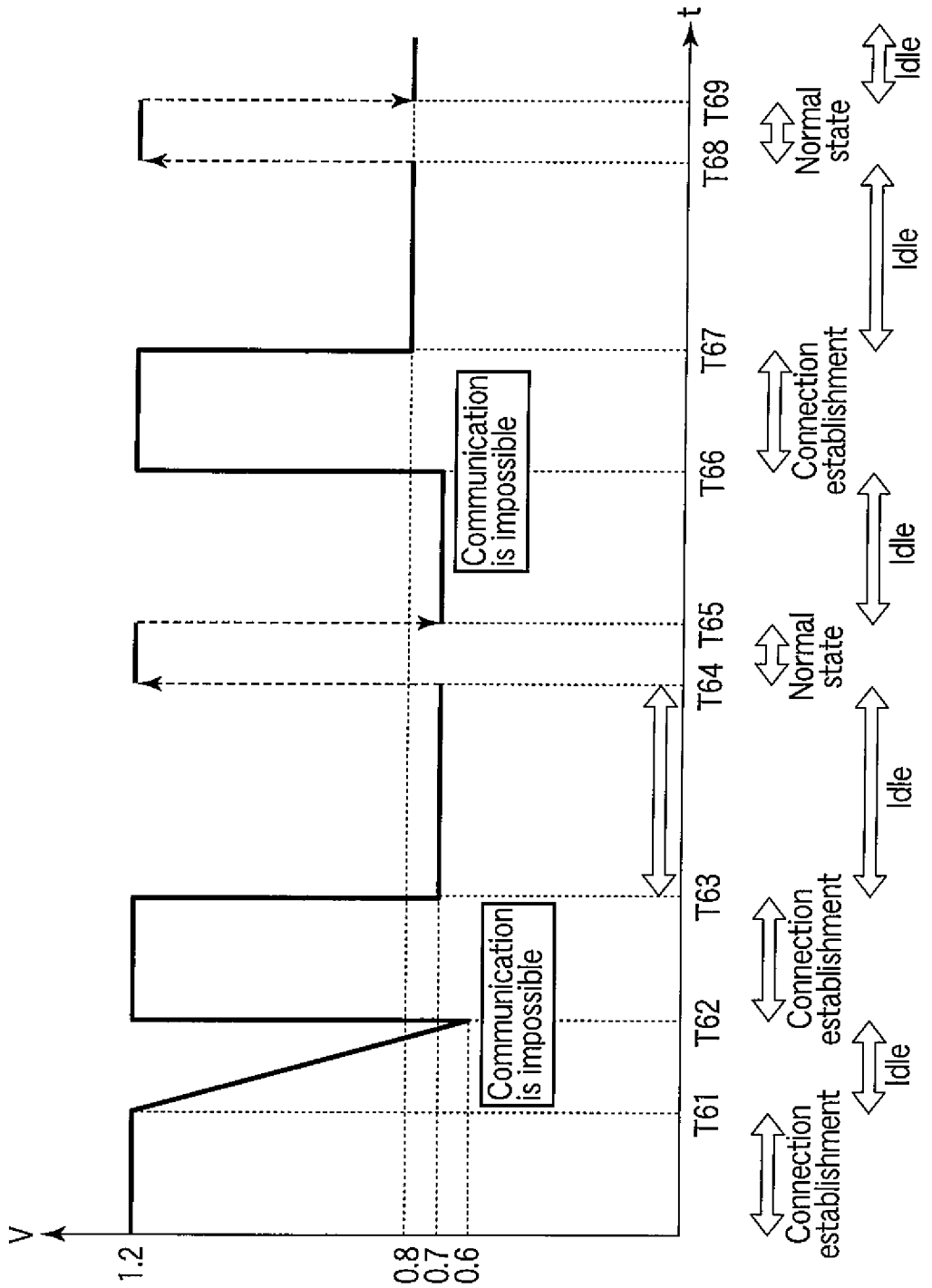
F I G. 10

US 8,478,918 B2

COMMUNICATION INTERFACE CIRCUIT, ELECTRONIC DEVICE, AND COMMUNICATION METHOD

CROSS-REFERENCE TO RELATED APPLICATIONS

This application is based upon and claims the benefit of priority from Japanese Patent Application No. 2009-023366, filed Feb. 4, 2009, the entire contents of which are incorporated herein by reference.

BACKGROUND

1. Field

One embodiment of the invention relates to a communication interface circuit which transmits a signal to or receives a signal from a communicatee device, an electronic device including the communication interface circuit, and a communication method.

2. Description of the Related Art

In recent years, with improvement of processing ability of a computer, high-speed data transfer is required for an interface with a peripheral device. As an interface standard with a storage device such as an HDD (Hard Disk Drive), the SAS (Serial Attached SCSI) standard which is one of SCSI (Small Computer System Interface) standards has prevailed. Although a conventional SCSI standard employs a parallel transfer scheme, the SAS standard employs a serial transfer scheme to make it possible to perform high-speed and high-precision data transfer.

In an SAS interface, as a process of establishing a connection between a transmission side and a reception side, search for communicatee is performed by a burst signal called OOB (Out Of Band). When the communicatee is found, speed negotiation is performed to determine a transfer speed between the transmission side and the reception side. When the communication is established as described above, the SAS interface is set in an idle state which waits for transmission/reception of a command.

In the idle state, in order to maintain a connection established state, the transmission side and the reception side must keep outputting predetermined signals. For this reason, in the idle state, although a command or data is not transmitted or received, electric power is disadvantageously consumed. In the SAS standard, power saving in the idle state is not regulated. In a conventional idle state, for example, in order to cope with various communication environments such as an attenuation level of a transmission signal on a transmission path, a signal is transmitted at a voltage of about 1.2 V equal to that in a normal state which performs command transmission and reception. For this reason, a large power consumption in the idle state is posed as a problem.

Some information processing devices using an interface of the S-ATA (Serial-ATAttachment) standard lower a power of an interface for connecting a south bridge to an HDD in a host when data transmission/reception is not performed for a predetermined period of time (for example, Jpn. Pat. Appln. KOKAI Publication No. 2006-18388).

In some power management technique for an HDD, repeaters are arranged between a controller and a plurality of HDDs which are hierarchically arranged and have different performances, and a function to stop and start the HDDs according to predetermined conditions is given to the repeaters (for example, Jpn. Pat. Appln. KOKAI Publication No. 2008-41050).

As in the SAS standard, in an interface which must keep transmitting and receiving a signal to maintain a connection after the connection is established, suppression of a power consumption in the transmission/reception of the signal is posed as a problem.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 3 is an exemplary view showing a hardware configuration of an HDD.

FIG. 4 is an exemplary view showing an internal configuration of an HDC (Hard Disk Controller).

FIG. 5 is an exemplary view schematically showing procedures to establish a connection.

FIG. 7 is an exemplary view for explaining a speed negotiation operation.

FIG. 10 is an exemplary view showing an example of a change in amplitude of a transmission signal from the start of communication.

DETAILED DESCRIPTION

Various embodiments according to the invention will be described hereinafter with reference to the accompanying drawings. In general, according to one embodiment of the invention, a communication interface circuit comprises a signal transmitting and receiving module configured to transmit a signal to a communicatee device, to receive a signal from the communicatee device, and to change a maximum amplitude of a transmission signal to the communicatee device; a connection establishment module configured to control the signal transmitting and receiving module in order to establish a connection to the communicatee device; a signal transmission control module configured to transmit a connection maintenance signal from the signal transmitting and receiving module to the communicatee device when a connection between the signal transmitting and receiving module and the communicatee device is established; and an amplitude control module configured to decrease the maximum amplitude of the connection maintenance signal transmitted from the signal transmitting and receiving module from a first amplitude value, to establish a connection to the communicatee device again by the connection establishment module when communication between the signal transmitting and receiving module and the communicatee device is disabled, and to set the maximum amplitude of the connection maintenance signal transmitted from the signal transmitting and receiving module to a second amplitude which is larger than the maximum amplitude of the connection maintenance signal obtained when the communication is disabled by a predetermined value.

Figure 1:
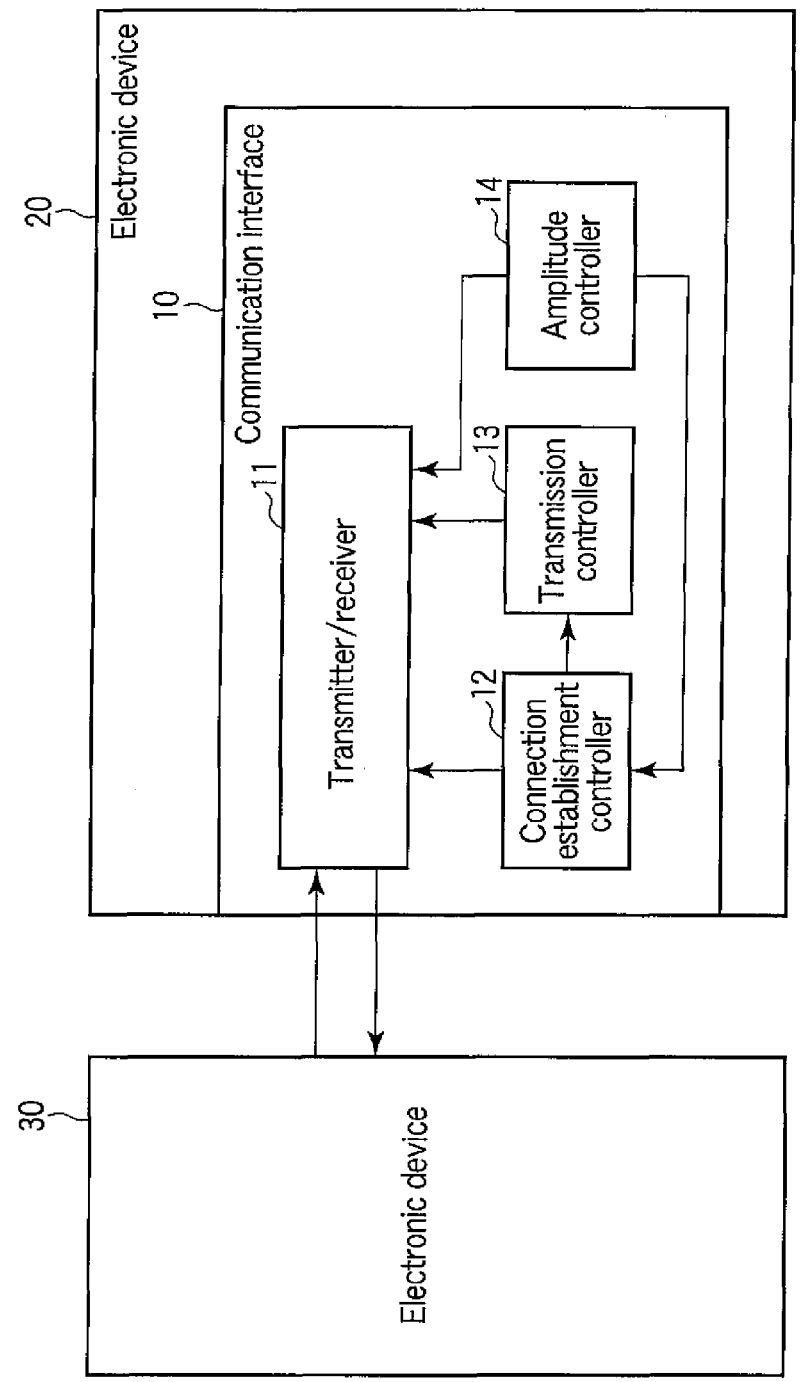
FIG. 1 is an exemplary view showing a configuration of a communication interface circuit according to a first embodiment.

FIG. 1 is a diagram showing a configuration of a communication interface circuit according to a first embodiment.

A communication interface circuit 10 shown in FIG. 1 is a circuit which is mounted on, for example, an electronic device 20 to transmit a signal to and receive a signal from an electronic device (communicatee device) 30. As the electronic device 20, for example, an HDD, a storage device such as an optical disk recording/reproducing device, various communication devices, an information processing device, and the like can be applied. The communicatee device 30 is not always a device arranged outside the electronic device 20. For example, the communicatee device 30 may be mounted in the electronic device 20. For example, when an information processing device such as a personal computer is applied as the electronic device 20, a CPU (Central Processing Unit) in the information processing device can be regarded as the communicatee device 30. In this case, the communicatee device 30 transmits information to and receives information from the CPU, and a communication interface included in a storage device connected to the inside of the information processing device can be regarded as the communication interface circuit 10 in FIG. 1.

The communication interface circuit 10, as shown in FIG. 1, comprises a signal transmitter/receiver 11, a connection establishment controller 12, a signal transmission controller 13, and an amplitude controller 14. The signal transmitter/receiver 11 is connected to the communicatee device 30 to transmit a signal to and receive a signal from the communicatee device 30. The signal transmitter/receiver 11 also includes a function of changing a maximum amplitude of a transmission signal to the communicatee device 30.

The connection establishment controller 12 controls a transmitting/receiving operation of a signal by the signal transmitter/receiver 11 to establish a connection to the communicatee device 30. An operation of the connection establishment controller 12 is not only executed at the start of communication with the communicatee device 30 but also may be executed in response to a request from the amplitude controller 14.

The signal transmission controller 13 causes the signal transmitter/receiver 11 to transmit a connection maintenance signal to the communicatee device 30. The connection maintenance signal is a signal to maintain a connection established state when a connection between the signal transmitter/receiver 11 and the communicatee device 30 is established. The connection maintenance signal, for example, is specific information such as a command transmitted every predetermined period of time. Alternatively, a signal different from a command or the like or a signal to be transmitted at predetermined intervals or continuously may be used. When at least the communicatee device 30 cannot normally receive the connection maintenance signal from the signal transmitter/receiver 11, a communication impossible state is set. In this state, in order to continue communication, a process to establish a connection again must be performed.

The amplitude controller 14 controls the maximum amplitude of the connection maintenance signal transmitted from the signal transmitter/receiver 11. As for the maximum amplitude of the connection maintenance signal, the amplitude controller 14 has an amplitude determining function to calculate a minimum value which can maintain a connection state. After the minimum amplitude is determined, the amplitude is set as a maximum amplitude of the connection maintenance signal to suppress a power consumption in transmission of the connection maintenance signal.

More specifically, the amplitude controller 14 gradually lowers the maximum amplitude of the connection maintenance signal transmitted from the signal transmitter/receiver 11 from a first amplitude in a state in which a connection between the signal transmitter/receiver 11 and the communicatee device 30 is established. This operation, for example, may be executed as an initial operation in which the communication interface circuit 10 and the communicatee device 30 are connected to each other and start communication therewith.

When the maximum amplitude of the connection maintenance signal lowers, the communication between the signal transmitter/receiver 11 and the communicatee device 30 finally becomes impossible. At this time, the amplitude controller 14 establishes the connection between the connection establishment controller 12 and the communicatee device 30 again. After the connection is established, the amplitude controller 14 sets the maximum amplitude of the connection maintenance signal transmitted from the signal transmitter/receiver 11 to a second amplitude which is larger than the maximum amplitude of the connection maintenance signal obtained when the communication is impossible by a predetermined value.

Under the control of the amplitude controller 14, in transmission of the connection maintenance signal, a power consumption for the transmission can be reduced as much as possible while reliably maintaining the connection between the communication interface circuit 10 and the communicatee device 30. For example, in a state in which the connection between the communication interface circuit 10 and the communicatee device 30 is merely maintained by the transmission of the connection maintenance signal, a power consumption in this state can be reduced as much as possible.

A communication protocol used in the communication interface circuit 10, for example, may be a protocol in which a period during which various items of control information are transmitted to and received from the communicatee device 30 after the establishment of connection and a waiting period to wait for transmission and reception of the control information are present. More specifically, in this case, in the waiting period, the connection maintenance signal to maintain the connection is transmitted. In such a case, the maximum amplitude of the connection maintenance signal is determined by the control of the amplitude controller 14 to make it possible to suppress a power consumption in the waiting period.

In this case, the first amplitude used in the amplitude determining process for the connection maintenance signal may be equal to or smaller than the maximum amplitude of a transmission signal obtained when the control information is transmitted from the signal transmitter/receiver 11. In this manner, in comparison with the transmission of the control information, a power consumption in the waiting period can be reduced. Furthermore, the period in which the control information is transmitted and received and the waiting period are provided to make it possible to reliably communicate a signal.

Figure 2:
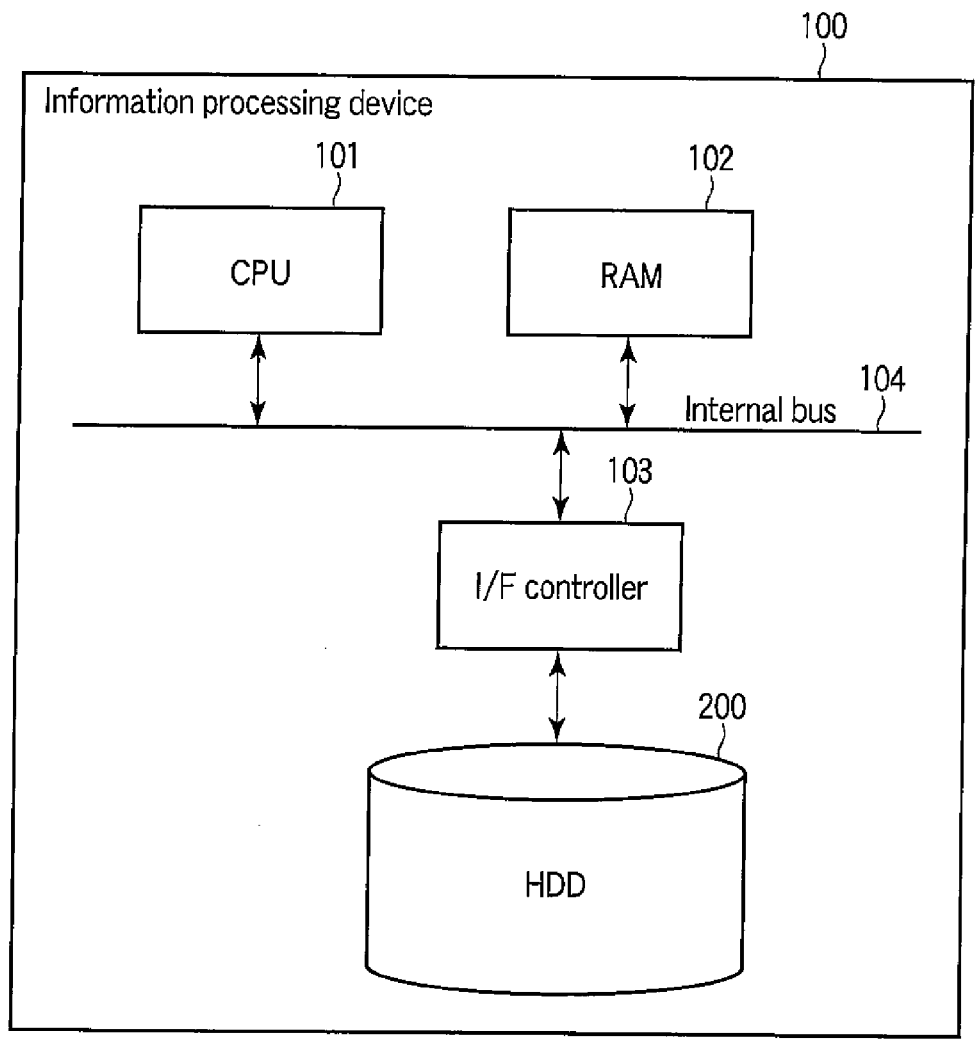
FIG. 2 is an exemplary view showing a hardware configuration of an information processing device according to a second embodiment.

An example in which the SAS is applied as a communication interface standard will be more concretely explained. FIG. 2 is a diagram showing a hardware configuration of an information processing device according to a second embodiment.

An information processing device 100 shown in FIG. 2 comprises a CPU (Central Processing Unit) 101, a RAM 102, and an interface (I/F) controller 103 which are connected to each other through an internal bus 104. An HDD 200 is connected to the interface controller 103.

The CPU 101 executes various programs stored in the HDD 200 to control the entire information processing device 100. The RAM 102 temporarily stores at least a part of the programs executed by the CPU 101 and various data required for processes by the programs. The interface controller 103 serially transmits data to and receives data from the HDD 200 according to the SAS standard.

The HDD 200 is connected to the interface controller 103 by the SAS interface to transmit data and receive data. The HDD 200, for example, stores the programs executed by the CPU 101, various data required for the execution, and the like.

FIG. 3 is a diagram showing a hardware configuration of the HDD 200.

The HDD 200 comprises an HDC (Hard Disk Controller) 201, an R/W (Read/Write) channel 202, an SVC (Servo Controller) 203, a disk drive unit 204, an MPU (Micro Processing Unit) 205, and a power supply circuit 206.

The HDC 201 is connected to a host side, i.e., the interface controller 103 of the information processing device 100 through the SAS interface, and communicates with the interface controller 103 on the host side according to the SAS protocol. The HDC 201 receives, from the host side, a control command and recording data to be recorded on a magnetic disk in the disk drive unit 204, and gives an error correction code to the recording data to output the recording data to the R/W channel 202. The HDC 201 receives reproduced data read from the magnetic disk from the R/W channel 202 and transmits the data to the host side.

The R/W channel 202 receives a signal read from the magnetic disk by a magnetic head in the disk drive unit 204, demodulates this signal to generate reproduced data, performs error correction to the data, and then outputs the data to the HDC 201. The R/W channel 202 modulates the recording data received from the HDC 201 to generate a recording data signal and outputs the recording data signal to the magnetic head to record the recording data signal on the magnetic disk.

The SVC 203 outputs a control signal to the disk drive unit 204 under the control of the MPU 205 and controls a moving operation of the magnetic head in the disk drive unit 204 and a rotating operation of the magnetic disk.

In the disk drive unit 204, the magnetic disk, the magnetic head, a spindle motor to rotate the magnetic disk, a motor to move the magnetic head and position the magnetic head on the magnetic disk, and the like are arranged.

The MPU 205 controls the entire HDD 200. For example, the MPU 205 controls a power on/off operation or the like to the parts in the HDD 200 at the start and the end of the operation of the HDD 200.

The power supply circuit 206 supplies an electric power to respective parts of the HDD 200 under the control of the MPU 205.

FIG. 4 is a diagram showing an internal configuration of the HDC 201. The HDC 201 comprises a receiver 210, a transmitter 220, a buffer memory 230, and an MPU 240. These circuits are mounted on, for example, one LSI (Large Scale Integration) chip.

The receiver 210 and the transmitter 220 comprise PHYs (physical layers) to communicate with each other through the SAS interface. The receiver 210 receives a differential signal pair including signals Rx+ and Rx− through a SAS connector 201a. The transmitter 220 transmits a differential signal pair including signals Tx+ and Tx− through the SAS connector 201a.

A level control circuit (Level Cnt.) 221 is arranged in the transmitter 220. The level control circuit 221 generates a voltage to drive a transmission signal based on a power supply voltage supplied from the power supply circuit 206. The level control circuit 221 changes a drive voltage of the transmission signal depending on a control signal from the MPU 240 to make it possible to change the maximum amplitude of a transmission signal to the host side.

The buffer memory 230 stores a command transmitted from the host side and received by the receiver 210 and data (to be simply referred to as "data" hereinafter) being attendant on the command. The command or the data is referred to by the MPU 240. The buffer memory 230 stores a command for transmission or data supplied from the MPU 240 and outputs the command or the data to the transmitter 220. The command or the data output to the transmitter 220 is transmitted to the host side.

The MPU 240 comprises an interface (I/F) processor 241 and a state machine 242. These functions are realized in such a manner that predetermined programs are executed by a processor included in the MPU 240. The functions may be realized by respective parts of hardware such as a processor and a logic circuit.

A RAM 243 is arranged inside the MPU 240. In the RAM 243, a connection establishment flag 243a, a command transmission/reception flag 243b, and a minimum amplitude 243c are stored. The RAM 243 may be arranged outside the MPU 240. Furthermore, a PHY setting register 244 is arranged inside the MPU 240.

The interface processor 241 controls a transmitting/receiving operation of a signal by the receiver 210 and the transmitter 220 according to the SAS protocol. For example, the interface processor 241 controls a connection establishing process with the host side executed by the receiver 210 and the transmitter 220 according to the SAS protocol. In this control, the interface processor 241 sets the connection establishment flag 243a representing whether a connection to the host side is established at present.

The interface processor 241 acquires a command or data received by the receiver 210 from the host side and stored in the buffer memory 230 and controls an internal operation of the HDD 200 depending on the command and the data. The interface processor 241 generates a transmission command or transmission data in response to a reception command to output the transmission command or the transmission data to the buffer memory 230 and causes the transmitter 220 to transmit the transmission command or the transmission data. The interface processor 241 sets the command transmission/reception flag 243b representing whether transmission of a command to the host side is performed in the transmitter 220 and reception of a command from the host side is performed in the receiver 210.

The interface processor 241 also includes a function of controlling a drive voltage of a transmission signal in the level control circuit 221 of the transmitter 220 to change the maximum amplitude of the transmission signal. This function is controlled depending on a set value of the PHY setting register 244. In the PHY setting register 244, mode information representing a communication state and an amplitude control value to designate the maximum amplitude of the transmission signal are set by the state machine 242.

The interface processor 241, on the basis of the mode information of the PHY setting register 244, controls the maximum amplitude of the transmission signal to a predetermined constant level when the present communication state is a normal state. On the other hand, when the present communication state is an idle state, on the basis of the amplitude control value set in the PHY setting register 244, the interface processor 241 changes the maximum amplitude of the transmission signal.

The control function of the communication establishing process, the setting function of the connection establishment flag 243a performed in accordance with the control, and the like, which are realized by the interface processor 241, may be realized by hardware different from the MPU 240. In this case, the hardware to realize the functions may be arranged inside, for example the transmitter 220.

The state machine 242 determines a present communication state set by the SAS interface based on the connection establishment flag 243a, the command transmission/reception flag 243b, or the like. The determination result is set in the PHY setting register 244 to notify the interface processor 241 of a communication state. The state machine 242, in the idle state, sets an amplitude control value to control the maximum amplitude of the transmission signal to the PHY setting register 244. The state machine 242 controls the maximum amplitude of the transmission signal from the transmitter 220 in the idle state to a minimum level.

FIG. 5 is a diagram schematically showing procedures to establish a connection. In the SAS standard, as procedures to establish a connection to a communicatee, two procedures, i.e., a communicatee searching procedure (step S1) and a speed negotiation procedure (step S2) are provided. The communicatee searching procedure is performed by transmitting/receiving an GOB signal 301 serving as a burst signal. In the speed negotiation procedure, a signal is transmitted to a found communicatee or received from the communicatee to make synchronization with the communicatee, so that a speed of communication with the communicatee is determined. The speed negotiation procedure will be explained later in detail. In the HDD 200 according to the embodiment, the above connection establishment operation is controlled by the interface processor 241.

Upon completion of these operations, a connection to the communicatee is established, and the state shifts to an idle state (step S3). In the idle state, the devices which communicate with each other output scramble patterns 302 to each other. In this manner, a connection establishment state is maintained to make it possible to wait for transmission/reception of a command. When the transmission/reception of the command is performed in the idle state, the idle state is canceled. Upon completion of the transmission/reception of the command, the state normally shifts to the idle state again.

Figure 6:
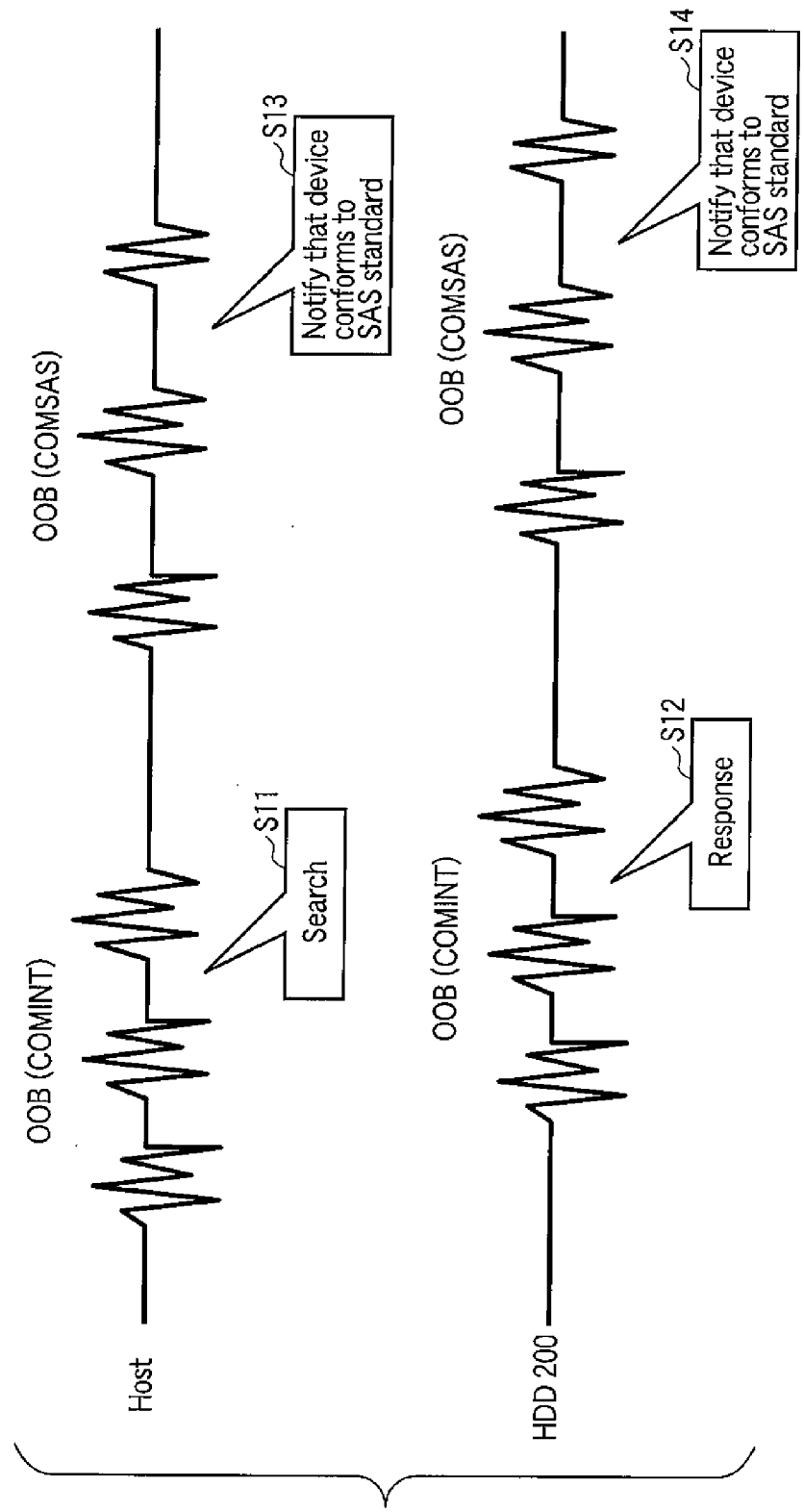
FIG. 6 is an exemplary view for explaining a communicatee searching operation.

FIG. 6 is a diagram for explaining a communicatee searching operation. In FIG. 6, a signal transmitted from the host side, i.e., the interface controller 103 of the information processing device 100 and a signal transmitted from the HDD 200 are shown in different rows to make the operation clearly understandable.

In the communicatee searching operation shown in step S11, the devices which communicate with each other transmit GOB signals called "COMINT" to search for a communicatee to each other. When a device which receives the GOB signal "COMINT" sends back the same GOB signal "COMINT" in response to the received signal, the devices recognize each other.

In the example in FIG. 6, the GOB signal "COMINT" is transmitted from the host side (step S11), and the GOB signal is received by the receiver 210 of the HDD 200. In the HDD 200, in response to the received signal, the same GOB signal "COMINT" is transmitted from the transmitter 220 under the control of the interface processor 241 (step S12). In this manner, the devices which communicate with each other recognize each other.

An GOB signal called "COMSAS" to notify that a given device is a device conforming to the SAS standard is transmitted and received. In the example in FIG. 6, the GOB signal "COMSAS" is transmitted from the host side (step S13), and the GOB signal is received by the receiver 210 of the HDD 200. In the HDD 200, in response to the received signal, the same GOB signal "COMSAS" is transmitted from the transmitter 220 under the control of the interface processor 241 (step S14). In this manner, it is recognized that the communicatee devices are devices conforming to the SAS standard. Thereafter, a speed negotiation operation is started.

FIG. 7 is a diagram for explaining a speed negotiation operation. In the speed negotiation operation, an align (ALIGN) signal including a plurality of primitives serving as 4-Byte unit signals is transmitted and received. As in the example in FIG. 6, when it is assumed that communication is started from the host side, an align signal called "ALIGN0" corresponding to speed of 1.5 Gbps is transmitted from the host side. In the HDD 200, synchronization with the align signal "ALIGN0" is made inside the receiver 210. When the synchronization is successful, the same align signal "ALIGN0" is transmitted from the transmitter 220 to the host side under the control of the interface processor 241. Also on the host side, synchronization with the align signal "ALIGN0" is made. When the synchronization is successful on both the host side and the HDD 200 side, both the host and the HDD 200 recognize that communication at 1.5 Gbps can be performed.

An align signal called "ALIGN1" corresponding to a communication speed of 3.0 Gbps is transmitted from the host side. In the HDD 200, synchronization with the align signal "ALIGN1" is made inside the receiver 210. When the synchronization is successful, the same align signal "ALIGN1" is transmitted from the transmitter 220 to the host side under the control of the interface processor 241. Synchronization with the align signal "ALIGN1" is also made on the host side. When the synchronizations are successful on the host side and the HDD 200 side, a communication speed is determined to be 3.0 Gbps. On the other hand, any one of the synchronizations is unsuccessful, the communication speed is determined to be 1.5 Gbps.

When the connection establishing process described above is normally executed, the interface processor 241 generates a scramble pattern to make the transmitter 220 transmit the scramble pattern, and monitors whether the scramble pattern from the host side is normally received by the receiver 210.

In the SAS standard, the maximum amplitude of the GOB signal in the communicatee searching operation is defined as 240 mV or more as shown in FIG. 5. After the connection is established, a maximum amplitude of a transmission/reception signal in a transmitting/receiving operation of a command or data is defined as 1.2 V or more. However, a signal amplitude of a scramble pattern in the idle state is not defined. Therefore, in the HDD 200, under the control of the state machine 242 of the MPU 240, the maximum amplitude of a transmission signal in the idle state is minimized to suppress a power consumption in the idle state.

Figure 8:
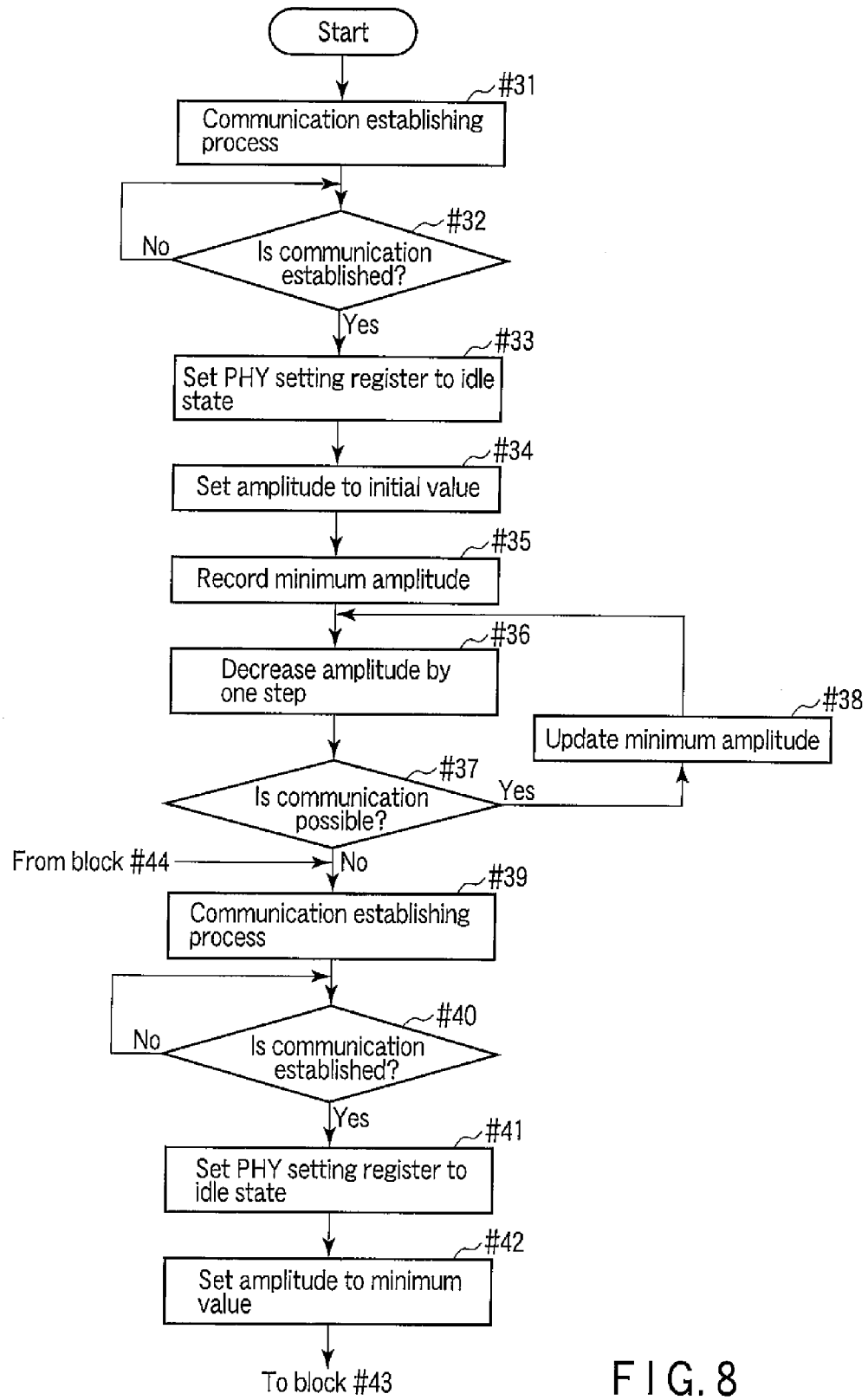
FIG. 8 is an exemplary flow chart (part 1) showing procedures performed from the start of communication to the end of communication in an HDD.
Figure 9:
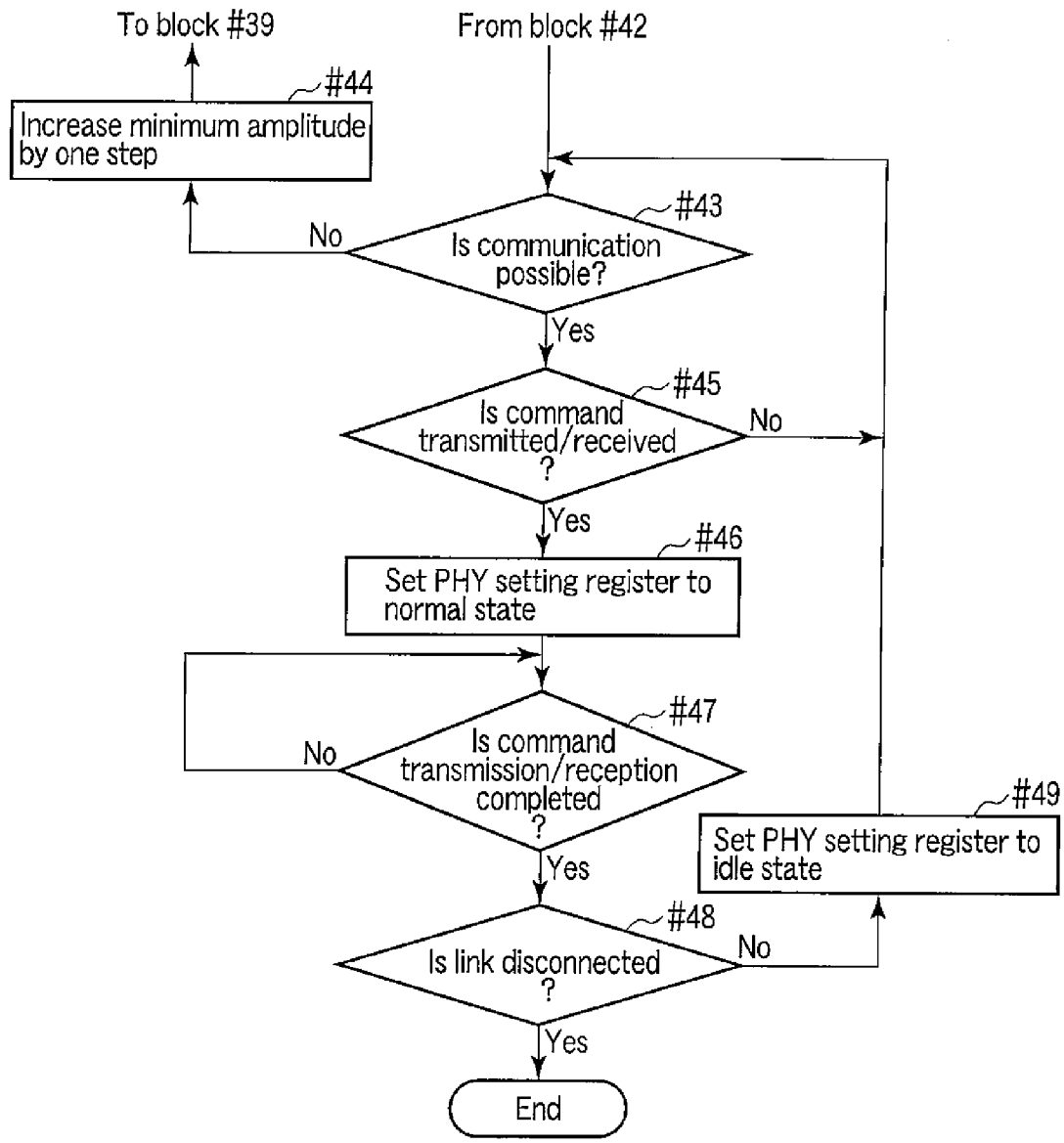
FIG. 9 is an exemplary flow chart (part 2) showing procedures performed from the start of communication to the end of communication in the HDD.

FIGS. 8 and 9 are flow charts showing procedures from the start of communication to the end of communication in the HDD.

In block #31, on the host side, i.e., between the interface controller 103 of the information processing device 100 and the HDD 200, a process to establish a connection is executed. As explained in FIGS. 6 and 7, in the HDD 200, a signal transmitting/receiving operation by the receiver 210 and the transmitter 220 is controlled by the interface processor 241, and the communicatee searching operation and the speed negotiation operation are executed. When these operations are normally completed to establish a connection, the interface processor 241 sets the connection establishment flag 243a to "1" and outputs a scramble pattern to the transmitter 220 to cause the transmitter 220 to transmit the scramble pattern to the host side.

In block #32, the state machine 242 monitors the connection establishment flag 243a to determine whether the connection is established. When the connection establishment flag 243a becomes "1", the process in block #33 is executed.

In block #33, the state machine 242 sets mode information of the PHY setting register 244 such that the mode information represents an idle state. In this manner, the interface processor 241 recognizes that the state shifts to the idle state.

In block #34, the state machine 242 sets an amplitude control value to set the maximum amplitude of a transmission signal (scramble pattern) to a predetermined initial value in the PHY setting register 244. This initial value is desirably set to such a relatively large value that a signal can be reliably transmitted to a communicatee or received from the communicatee regardless of a communication environment. For example, the initial value is set to 12 V which is the maximum value in a command transmitting/receiving state.

The interface processor 241 supplies a control signal depending on an amplitude control value of the PHY setting register 244 to the level control circuit 221 of the transmitter 220 to control the maximum value of a transmission signal to the initial value. The interface processor 241 sets, in the level control circuit 221, control parameters such as "Drive Strength" representing the strength/weakness of a leading/trailing edge of the transmission signal, "Slew Rate" representing a ratio of a period of a predetermined voltage level to a unit time, and "Emphasis" representing a gain of an amplitude of the transmission signal to gradually change the maximum amplitude of the transmission signal.

In block #35, the state machine 242 records an amplitude control value set to the PHY setting register 244 in block #34 on the RAM 243 as the minimum amplitude 243c.

In block #36, the state machine 242 changes the amplitude control value of the PHY setting register 244 such that the maximum amplitude of the transmission signal is decreased by one step from a present value. The interface processor 241 supplies a control signal depending on the changed amplitude control value to the level control circuit 221 to decrease the maximum amplitude of the transmission signal by one step.

When the receiver 210 and the transmitter 220 cannot communicate with the host side, the interface processor 241 changes the connection establishment flag 243a to "0". On the other hand, when the state in which the communication with the host side is possible is maintained, the connection establishment flag 243a is kept at "1".

In block #37, the state machine 242 determines whether communication with the host side is possible based on the value of the connection establishment flag 243a. When the communication is possible, the process in block #38 is executed. On the other hand, when the communication is impossible, the process in block #39 is executed.

In block #38, the state machine 242 updates the minimum amplitude 243c in the RAM 243 by the amplitude control value set in the PHY setting register 244 in block #36. Thereafter, the process returns to the process in block #36 to decrease the maximum amplitude of the transmission signal by one step further.

In block #39, the communication with the host side is cut, and by the same procedure as in block #31, a process to establish a connection to the host side is executed again. When the connection is established, the connection establishment flag 243a is set to "1".

In block #40, the state machine 242 monitors the connection establishment flag 243a to determine whether the connection is established. When the connection establishment flag 243a becomes "1", the process in block #41 is executed.

In block #41, the state machine 242 sets the mode information in the PHY setting register 244 such that the mode information represents an idle state. In this manner, the interface processor 241 recognizes that the step shifts to the idle state.

In block #42, the state machine 242 reads the minimum amplitude 243c from the RAM 243 and sets the read value to an amplitude control value of the PHY setting register 244. The interface processor 241 supplies a control signal depending on the amplitude control value of the PHY setting register 244 to the level control circuit 221 of the transmitter 220 to control the maximum value of the transmission signal. In this manner, the maximum value of the transmission signal is set to a minimum value of the maximum amplitude obtained when the normal communication with the host side is possible before the communication with the host side is cut.

After the step, when the receiver 210 and the transmitter 220 cannot communicate with the host side, the interface processor 241 changes the connection establishment flag 243a to "0". On the other hand, the state in which the communication with the host side is possible is maintained, the connection establishment flag 243a is kept at "1".

In block #43, the state machine 242 determines whether communication with the host side is possible based on the value of the connection establishment flag 243a. When the state in which the communication is possible is maintained, the process in block #45 is executed. On the other hand, when the communication becomes impossible, the process in block #44 is executed.

In block #44, the state machine 242 updates the minimum amplitude 243c in the RAM 243 by an amplitude which is higher than the maximum amplitude of the present transmission signal by one step. Thereafter, the process returns to the process in block #39, and a process to establish a connection to the host side is executed again. In this case, after the connection is established, when the state shifts to the idle state, the maximum amplitude of the transmission signal is set to a value which is higher than that in the previous idle state by one step.

In block #45, in the idle state, when transmission of a command to or reception of a command from the host side is started by the receiver 210 and the transmitter 220, the interface processor 241 changes the transmission/reception flag in the RAM 243 from "0" to "1".

The state machine 242 monitors the command transmission/reception flag 243b to determine whether the transmission/reception of the command is started. When the transmission/reception of the command is started, the process in block #46 is executed. When the transmission/reception is not started, the process in block #43 is executed again.

In block #46, the state machine 242 sets the mode information in the PHY setting register 244 such that the mode information represents a normal state. In this manner, the interface processor 241 recognizes that the idle state shifts to the normal state, and the interface processor 241 supplies a control signal to the level control circuit 221 to set the maximum amplitude of the transmission signal to 1.2 V.

In block #47, when the transmission of the command to or reception of the command from the host side is completed, the interface processor 241 changes the command transmission/reception flag 243b in the RAM 243 to "0".

The state machine 242 monitors the command transmission/reception flag 243b to determine whether the transmission/reception of the command is completed. When the operation is completed, the process in block #48 is executed.

In block #48, the state machine 242 monitors the notice from the interface processor 241 to determine whether a link disconnection in which the communication with the host side is cut depending on a command occurs. When the link disconnection occurs, the communication process is ended. On the other hand, when the link disconnection does not occur, the process in block #49 is executed.

In block #49, the state machine 242 sets the mode information in the PHY setting register 244 such that the mode information represents the idle state. In this manner, the interface processor 241 recognizes that the state shifts to the idle state. According to this, the amplitude control value set in the PHY setting register 244 is loaded, and the maximum amplitude of the transmission signal is adjusted to an amplitude corresponding to the loaded amplitude control value. Thereafter, the process returns to block #43, a state in which the state machine 242 waits for transmission/reception of the command is set.

FIG. 10 is a diagram showing an example of a change in amplitude of a transmission signal from the start of communication. In the example in FIG. 10, in a period from the start of communication to timing T61, a connection establishing procedure to the host side is executed in the HDC 201 of the HDD 200. When the connection is established at time T61, the communication state of the HDC 201 is an idle state, and a scramble pattern is transmitted to the host side. According to this, the maximum amplitude of the transmission signal to the host side is gradually decreased from a predetermined initial value (1.2 V in the example in FIG. 10).

It is assumed that, at timing T62 at which the maximum amplitude of the transmission signal decreases to, for example, 0.6 V, communication between the HDD 200 and the host side is impossible. In the HDC 201, a connection establishing procedure to the host side is executed again. When the connection is established at timing T63, the communication state with the HDC 201 becomes the idle state, and a scramble pattern is transmitted to the host side. At this time, the maximum amplitude of the transmission signal is set to 0.7 V which is higher than the maximum amplitude at timing T62 by 0.1 V.

In the HDC 201, at the start of communication, a procedure to determine an amplitude like the procedure performed until timing T63 is performed, whereby the maximum amplitude of the transmission signal in the idle state is adjusted to a minimum value within a range in which the connection can be maintained. In this manner, a power consumption in the idle state is suppressed.

In the embodiment described above, the maximum amplitude of the transmission signal at timing T63 is set to an amplitude which is higher than the maximum amplitude at timing T62 by one step. However, in consideration of a margin to a change in communication environment occurring thereafter, the maximum amplitude which is higher than the maximum amplitude at timing T62 by two or more steps may be set.

It is assumed that after the idle state is set at timing T63, transmission of a command to the host side or reception of a command from the host side is started in the HDC 201 at timing T64. A communication state in the HDC 201 shifts to a normal state, and the HDC 201 executes a command transmitting process to the host side and a command receiving process from the host side. At this time, the maximum amplitude of the signal to transmit a command or data from the HDC 201 to the host side is set to a regular value of 1.2 V. When the command transmitting/receiving process between the HDC 201 and the host side is completed at timing T65, the communication state of the HDC 201 shifts to the idle state again. At this time, the maximum amplitude of the transmission signal to the host side is set to 0.7 V which is equal to the maximum amplitude in the period between timing T63 and timing T64.

At timings T64 and T65, as explained in blocks #46 and #49 in FIG. 9, the interface processor 241 easily detects a change in communication state by the mode information in the PHY setting register 244. The interface processor 241 can adjust the maximum amplitude of the transmission signal instantaneously to an amplitude corresponding to each communication state.

It is assumed that after the idle state is set at timing T65, communication between the HDC 201 and the host side is impossible for some reason at timing T66. In the HDC 201, a connection establishing procedure to the host side is executed again. When the connection is established at timing T67, the HDC 201 shifts to the idle state to transmit a scramble pattern to the host side. At this time, the maximum amplitude of the transmission signal is set to 0.8 V which is higher than the maximum amplitude obtained before timing T66 by one step.

In this manner, in the idle state, a communication impossible state occurs due to noise or the like, the connection establishing procedure is automatically executed again to make it possible to restore the communication. After the communication is restored, the maximum amplitude of the transmission signal in the idle state is set to a value higher than the maximum amplitude at timing T66 to make it possible to more stably maintain the connection state. When the communication is restored, a process to determine an amplitude executed in a period from the start of communication to timing T62 is not executed. For this reason, the communication can be restored in a short period of time. The maximum amplitude of the transmission signal after the communication is restored may be set to a value which is higher by not only one step but also two or more steps.

Thereafter, at timing T68, when a command is received from the host side, the HDC 201 shifts to a normal state, and a command transmitting procedure to the host side and a command receiving procedure from the host side are executed. At this time, the maximum amplitude of the transmission signal from the HDC 201 to the host side is set to a regular value of 1.2 V. When the command transmitting/receiving process between the HDC 201 and the host side is completed at timing T69, the HDC 201 shifts to the idle state again. At this time, the maximum amplitude of the transmission signal to the host side is set to 0.8 V which is equal to the value obtained in the period from timing T67 to timing T68.

As described above, in the HDD 200, at the start of communication through an SAS interface, a procedure to determine the maximum amplitude of the output signal in the idle state is performed to make it possible to suppress a power consumption in the idle state to a minimum electric power at which a connection can be maintained. Since the maximum amplitude to be set is determined on a communication environment at this time, an effect which can reduce a power consumption and an effect which can reliably maintain a connection of communication can be compatible. In the SAS interface which allows a dual port, the number of communication devices such as HDDs frequently increases. However, in the entire system, the larger the number of connection devices, the higher the power consumption suppressing effect.

In this manner, the embodiment provides a communication interface circuit, an electronic device, and a communication method which can suppress a power consumption in transmission of a connection maintenance signal after the connection is established.

In the embodiments described above, the maximum amplitude of the transmission signal obtained when the state returns to the idle state at timing T67 is automatically set to a value higher than the maximum amplitude at a previous idle state. However, when the communication is impossible at timing T66, the procedures including the amplitude determining procedure and performed from the start of communication may be executed again. In this case, in the flow charts in FIGS. 8 and 9, when it is determined in block #43 that communication is impossible, the procedures started from block #31 are executed again. With these procedures, a time required until the communication is restored becomes long. After the communication is restored, the connection state can be more reliably maintained.

In the procedures in FIGS. 8 and 9, an initial value in block #34, the number of steps of an amplitude control value decreased in block #36, and the number of steps of an amplitude value increased in block #44 may be arbitrarily set by an operation input by a user.

The initial values and the numbers of steps may be automatically set on the basis of a previous operation history. For example, the initial value in block #34 may be set to an amplitude which is higher than the maximum amplitude of the transmission signal obtained when the idle state is lastly set by a predetermined number of steps. The maximum amplitude of the transmission signal obtained when the idle state is lastly set can be easily known in such a manner that, for example, the minimum amplitude 243c is stored in a nonvolatile storage medium (for example, a magnetic disk or the like) in the HDD 200. With these procedures, the amplitude determining procedure can be executed in a shorter period of time. However, the number of steps which is increased at this time is desirably two or more.

In the second embodiment, an amplitude determining function realized by the interface processor 241 and the state machine 242 may be arranged not only on the HDD 200 side but also on the host side, i.e., in the interface controller 103.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The various modules of the systems described herein can be implemented as software applications, hardware and/or software modules, or components on one or more computers, such as servers. While the various modules are illustrated separately, they may share some or all of the same underlying logic or code. The accompanying claims and their equivalents are intended to cover such forms or modifications as would fall within the scope and spirit of the inventions.

What is claimed is:

1. A communication interface apparatus comprising:
a signal transmitter and receiver configured to transmit a signal to a counterpart device, to receive a signal from the counterpart device, and to change a substantially maximum amplitude of a transmission signal to the counterpart device;
a connection establishment module configured to control the signal transmitter and receiver in order to establish a connection to the counterpart device;
a signal transmission controller configured to control the signal transmitter and receiver in order to transmit a connection maintenance signal from the signal transmitter and receiver to the counterpart device when a connection between the signal transmitter and receiver and the counterpart device is established; and
an amplitude controller configured to control the signal transmitter and receiver in order to decrease the substantially maximum amplitude of the connection maintenance signal from the signal transmitter and receiver from a first amplitude value, in order to establish a connection to the counterpart device again by the connection establishment module when communication between the signal transmitter and receiver and the counterpart device is disabled, and in order to set the substantially maximum amplitude of the connection maintenance signal from the signal transmitter and receiver to a second amplitude larger than the substantially maximum amplitude of the connection maintenance signal when the communication is disabled by a predetermined value,
wherein the connection maintenance signal is transmitted from the signal transmitter and receiver when a connection between the signal transmitter and receiver module and the counterpart device is established while waiting for transmission and reception of control information, and
the first amplitude is set to the substantially maximum amplitude or less of the transmission signal when the control information is transmitted from the signal transmitter and receiver to the counterpart device.

2. The communication interface apparatus of claim 1, wherein
the amplitude controller is configured to cause the connection establishment module to establish a connection to the counterpart device again when the communication between the signal transmitter and receiver and the counterpart device is disabled after substantially the maximum amplitude of the connection maintenance signal is set to the second amplitude, and,
the amplitude controller is configured to set the substantially maximum amplitude of the connection maintenance signal from the signal transmitter and receiver to a value higher than the substantially maximum amplitude of the connection maintenance signal transmitted immediately before the communication is disabled after the connection is established.

3. The communication interface apparatus of claim 1, wherein
the amplitude controller is configured to cause the connection establishment module to establish a connection to the counterpart device again when the communication between the signal transmitter and receiver and the counterpart device is disabled after the substantially maximum amplitude of the connection maintenance signal is set to the second amplitude, and,
the amplitude controller is configured to decrease the substantially maximum amplitude of the connection maintenance signal from the signal transmitter and receiver from the first amplitude in order to determine the second amplitude again after the connection is established.

4. The communication interface apparatus of claim 1, wherein
the amplitude controller is configured to set the first amplitude to a value larger than the substantially maximum amplitude of a lastly transmitted connection maintenance signal by a predetermined value.

5. The communication interface apparatus of claim 1, wherein
the amplitude controller is configured to cause the connection establishment module to establish a connection to the counterpart device again when the communication between the signal transmitter and receiver and the counterpart device is disabled after the substantially maximum amplitude of the connection maintenance signal is set to the second amplitude, and,
the amplitude controller is configured to set the substantially maximum amplitude of the connection maintenance signal from the signal transmitter and receiver to a value higher than the substantially maximum amplitude of the connection maintenance signal transmitted immediately before the communication is disabled after the connection is established.

6. The communication interface apparatus of claim 1, wherein
the amplitude controller is configured to cause the connection establishment module to establish a connection to the counterpart device again when the communication between the signal transmitter and receiver and the counterpart device is disabled after the substantially maximum amplitude of the connection maintenance signal is set to the second amplitude, and,
the amplitude controller is configured to decrease the substantially maximum amplitude of the connection maintenance signal from the signal transmitter and receiver from the first amplitude in order to determine the second amplitude again after the connection is established.

7. The communication interface apparatus of claim 1, wherein
the amplitude controller is configured to set the first amplitude to a value larger than the substantially maximum amplitude of a lastly transmitted connection maintenance signal by a predetermined value.

8. An electronic device comprising a communication interface module, the communication interface module comprising:
a signal transmitter and receiver configured to transmit a signal to a counterpart device, to receive a signal from the counterpart device, and to change a substantially maximum amplitude of a transmission signal to the counterpart device;
a connection establishment module configured to control the signal transmitter and receiver in order to establish a connection to the counterpart device;
a signal transmission controller configured to control the signal transmitter and receiver in order to transmit a connection maintenance signal from the signal transmitter and receiver to the counterpart device when a connection between the signal transmitter and receiver and the counterpart device is established; and
an amplitude controller configured to control the signal transmitter and receiver in order to decrease the substantially maximum amplitude of the connection maintenance signal from the signal transmitter and receiver from a first amplitude value, in order to establish a connection to the counterpart device again by the connection establishment module when communication between the signal transmitter and receiver and the counterpart device is disabled, and in order to set the substantially maximum amplitude of the connection maintenance signal from the signal transmitter and receiver to a second amplitude larger than the substantially maximum amplitude of the connection maintenance signal when the communication is disabled by a predetermined value,
wherein the connection maintenance signal is transmitted from the signal transmitter and receiver when a connection between the signal transmitter and receiver module and the counterpart device is established while waiting for transmission and reception of control information, and
the first amplitude is set to the substantially maximum amplitude or less of the transmission signal when the control information is transmitted from the signal transmitter and receiver to the counterpart device.

9. A communication method comprising:
establishing a connection to a counterpart device;
transmitting a connection maintenance signal to the counterpart device, and decreasing a substantially maximum amplitude of the connection maintenance signal from a first amplitude;
establishing a connection to the counterpart device again when communication with the counterpart device is disabled; and
transmitting the connection maintenance signal to the counterpart device, and setting the substantially maximum amplitude of the connection maintenance signal to a second amplitude larger than the substantially maximum value of the connection maintenance signal when the communication is disabled by a predetermined value,
wherein the connection maintenance signal is transmitted from the signal transmitter and receiver when a connection between the signal transmitter and receiver module and the counterpart device is established while waiting for transmission and reception of control information, and
the first amplitude is set to the substantially maximum amplitude or less of the transmission signal when the control information is transmitted from the signal transmitter and receiver to the counterpart device.

* * * * *